United States Patent [19]
Tabata

[11] Patent Number: 4,479,121
[45] Date of Patent: Oct. 23, 1984

[54] ELECTROCHROMIC DISPLAY DEVICE HAVING CONSTANT COLOR DENSITY AND DRIVING METHOD THEREFOR

[75] Inventor: Junichi Tabata, Tokyo, Japan

[73] Assignee: Seiko Instruments & Electronics Ltd., Tokyo, Japan

[21] Appl. No.: 256,160

[22] Filed: Apr. 21, 1981

[30] Foreign Application Priority Data

Apr. 25, 1980 [JP] Japan ................... 55-55203

[51] Int. Cl.$^3$ ............................................. G09G 3/34
[52] U.S. Cl. ................... 340/785; 340/763; 350/357
[58] Field of Search ............... 340/763, 783, 785; 350/357, 363

[56] References Cited
U.S. PATENT DOCUMENTS 4,228,431 10/1980 Barclay et al. ................. 340/785

Primary Examiner—Marshall M. Curtis
Attorney, Agent, or Firm—Robert E. Burns; Emmanuel J. Lobato; Bruce L. Adams

[57] ABSTRACT

An electrochromic display device has an electrolyte contained between two spaced-apart substrates. A plurality of display segments are disposed on the surface of at least one of the substrates in contact with the electrolyte, and a counter electrode is disposed on the surface of the other substrate in contact with the electrolyte. Each of the display segments comprises a transparent electrode and an electrochromic layer disposed on the transparent electrode such that the display segment exhibits either colored or bleached states depending on the amount of electric charge held by the display segment. A charge transfer voltage is periodically applied between preselected bleached and colored display segments to effect transfer of electric charges through the electrolyte to thereby periodically change the display state. The difference between the coloration electric charge quantity at the present display state and the coloration electric charge quantity at the next display state is compensated for by either injecting or extracting electric charge into or from the display segments so as to maintain the color density constant.

15 Claims, 7 Drawing Figures

| DISPLAY STATE | DISPLAY ELECTRODE | | | | | | | AMOUNT OF INJECTION OF COLORATION ELECTRIC CHARGE | AMOUNT OF EXTRACTION OF COLORATION ELECTRIC CHARGE |
|---|---|---|---|---|---|---|---|---|---|
| | A | B | C | D | E | F | G | $x(q)$ | $x(q)$ |
| 1 | x | | | x | x | x | | 0 | 4 |
| 2 | o | | x | o | o | | o | 3 | 0 |
| 3 | | | o | | | x | | 0 | 0 |
| 4 | x | | | x | | o | | 0 | 1 |
| 5 | o | x | | o | | | | 1 | 0 |
| 6 | | | | o | | | | 1 | 0 |
| 7 | | o | | x | x | x | x | 0 | 3 |
| 8 | | | | o | o | o | o | 4 | 0 |
| 9 | | | | x | | | | 0 | 1 |
| 0 | | | | o | | | x | 0 | 0 |

ELECTROCHROMIC DISPLAY DEVICE HAVING CONSTANT COLOR DENSITY AND DRIVING METHOD THEREFOR

BACKGROUND OF THE INVENTION

The present invention relates to a display device using an electrochromic substance (hereafter referred to as an EC material) and a driving method thereof. More particularly, the present invention relates to a driving system for transferring a coloration electric charge held in electrodes in a coloration state to electrodes in a bleaching state (hereinafter referred to as an electric charge transfer drive) by applying a voltage therebetween.

The conventional EC display device driven by the electric charge transfer drive technique is advantageous in that it is driven by a single power source, the display does not exhibit color shading and the response time is quick. However, there is a disadvantage that the conventional EC display device necessitates the use of display dummy electrodes for constantly equalizing the number of the display electrodes which changes into the colored state to the number of display electrodes which changes into the bleached state, for the sake of eliminating the non-uniformity of coloration density caused by the electric charge transfer. Therefore the display area of the display electrodes is somewhat limited.

SUMMARY OF THE INVENTION

It is an object of the present invention to provide a display device having a relatively large display area. It is another object of the present invention to provide a display device which does not use display dummy electrodes and uses instead a constant current driving circuit in the electric charge transfer drive. It is a further object of the present invention to provide an electrochromic display device in which the display state is changed by applying a voltage between an electrode in a coloration state and an electrode in a bleaching state and comprising plural electrodes for displaying coloration, a counter electrode, a bleaching constant current circuit for extracting a coloration electric charge and a coloration constant current circuit for injecting a coloration electric change, the bleaching constant current circuit and the coloration constant current circuit being connected between the counter electrode and a power source. It is still a further object of the present invention to provide a driving method of an electrochromic display device in which the display state is changed by applying a voltage between an electrode in a coloration state and an electrode in a bleaching state comprising the steps of receiving information indicative of the difference between the coloration electric charge quantity at a first display state and the coloration electric charge quantity at a second display state and extracting or injecting electric charge for compensating for the difference.

DETAILED DESCRIPTION OF THE PREFERRED EMBODIMENTS

Figures 1, 2:
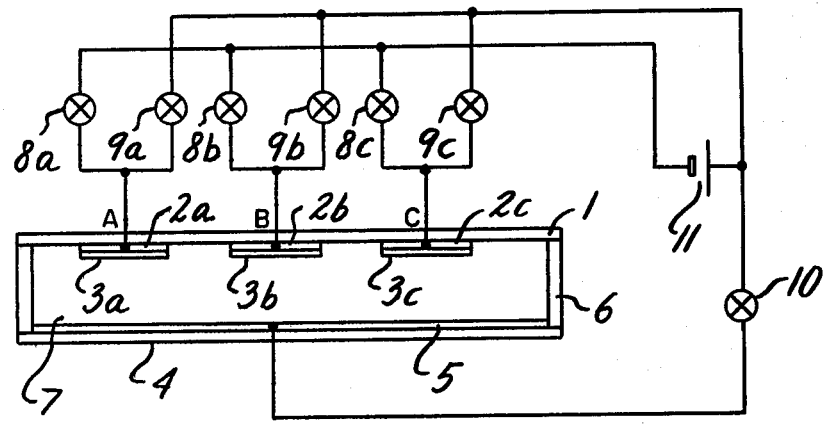
FIG. 1 shows a schematic illustration of the conventional EC display device for illustrating the electric charge transfer drive.
FIG. 2 shows a combination table of the conventional electric charge transfer.

FIG. 1 shows a schematic illustration of an EC display device for illustrating the conventional electric charge transfer drive.

The EC display device comprises transparent electrodes 2a to 2c formed by evaporating $In_2O_3$ or the like on a plane of a transparent substrate 1 which contacts an electrolyte 7, and EC films 3a to 3c are formed on the transparent electrodes in the shape of display picture elements by evaporating $WO_3$ or $MoO_3$. The electrolyte 7 contains a powder of $TiO_2$ to serve as a white background of the display.

Though omitted in FIG. 1, the portion of the transparent electrodes 2a to 2c other than the display picture element pattern region, i.e., the display region formed by the EC films 3a to 3c, is coated with an insulating film to prevent current leakage. The transparent electrodes 2a to 2c and the EC films 3a to 3c are designated generally as display electrodes or display segments A to C.

The electrolyte 7 is held between the substrate 1 and a substrate 4 which are separated by a spacer 6. A counter electrode 5 formed of Au or the like is disposed on a plane of the substrate 4 which contacts the electrolyte 7.

Referring now to the circuit portion, coloration switches 8a to 8c connect each of the transparent electrodes 2a to 2c to a negative electrode of a battery 11, bleaching switches 9a to 9c connect each of the transparent electrodes 2a to 2c to a positive electrode of a battery 11, and a coloration electric charge injecting switch 10 connects the counter electrode 5 to the positive electrode of the battery 11.

The operation of the EC display device of the above mentioned construction will now be described.

Initially the coloration electric charge is injected into the EC display device. The coloration electric charge is injected, for example, into the display electrode A. When the switches 8a and 10 are closed, a current flows from the counter electrode 5 to the display electrode A, and the EC film 3a is deoxidized and colored. When the switches 8a and 10 are opened after the EC film 3a gets to a predetermined coloration density, the EC film 3a holds the deoxidizing state and the display holds the coloration state: that is what is called a memory state.

For transferring the coloration electric charge held in the display electrode A to the display electrode C, the switches 9a and 8c are closed so that the positive electrode of the battery is connected to the display electrode A and the negative electrode of the battery is connected to the display electrode C. On this occasion, the coloration electric charge is discharged from the display electrode A and injected into the display electrode C transferring through the electrolyte 7. As a result, the display electrode A changes from the coloration state to the bleaching state, the display electrode C is colored and the display state is changed.

The driving principle of the electric charge transfer drive technique has been illustrated so far. In actual practice, when the display device is operated, the number of the display electrodes which changes into the coloration state is not always equal to the number of the display electrodes which changes into the bleaching state, and a difference in the coloration density, i.e., a color shading, would be produced between the display electrodes if the electric charge transfer drive were simply carried out.

Accordingly, in order to equalize the number of the display electrodes which changes into the coloration state to the number of the display electrodes which changes into the bleaching state constantly, a set of display dummy electrodes are utilized.

FIG. 2 shows combinations of the coloration state and bleaching state when the dummy electrodes are used, in which the combinations to display the ten numerals of one digit are shown using seven display electrodes A to G in the form of "8". The display dummy electrodes are named dummy 1, dummy 2 and dummy 3, and each of the display areas of the dummies 1 to 3 are designated in the ratio of 1:2:2, provided that each of the areas of the display electrodes A to G are 1. The three kinds of the display dummy electrodes (the dummies 1 to 3) are made of the same material as the display electrodes A to G.

The mark O indicates the display electrodes which change into the coloration state, the mark X indicates the display electrodes which change into the bleaching state, and no mark indicates the state in which both the coloration and bleaching states are not changed, i.e., in the memory state.

As shown in FIG. 2, the number of the display electrodes which changes into the coloration state is equal to the number of the display electrodes which changes into the bleaching state in all of the possible display states, so an excellent electric charge transfer without the drawback color shading is carried out.

Figure 3:
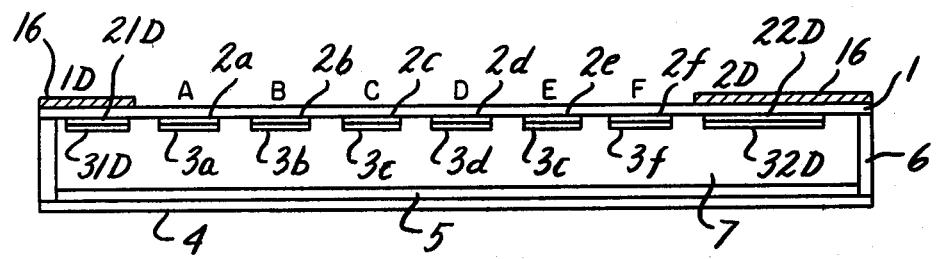
FIG. 3 shows a sectional view of the conventional EC display device using dummy electrodes.

FIG. 3 shows an EC display device incorporating the display dummy electrodes. Display dummy electrodes 31D and 32D are coated with a masking plate 16 and are not visible from the display portion of the EC display device.

As illustrated so far, the display dummy electrodes are necessary for the conventional electric charge transfer drive, therefore the effective display area occupied by the display portion of the EC display device is small and the design of the device is restricted.

In order to solve this problem, the display dummy electrodes are removed and a constant current driving circuit is used instead in the electric charge transfer drive system of the present invention.

Figure 4:
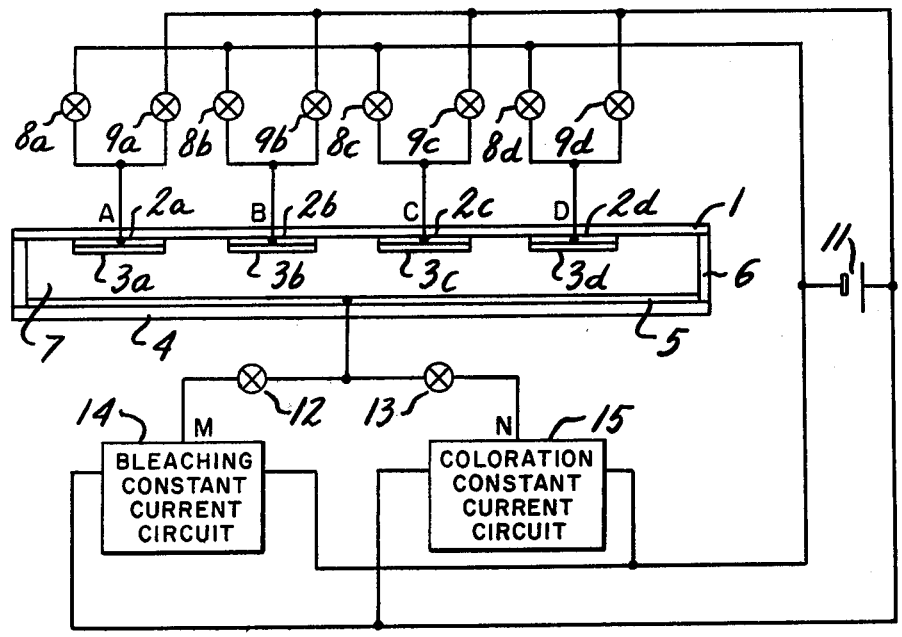
FIG. 4 shows a first embodiment according to the present invention.

FIG. 4 shows a sectional view and a circuit diagram of the EC display device according to the present invention, in which the same parts as shown in FIG. 1 are numbered identically and the explanation of which is omitted.

Numeral 12 denotes a bleaching constant current switch connected to both the counter electrode 5 and an output terminal M of a bleaching constant current circuit 14. Numeral 13 denotes a coloration constant current switch connected to both the counter electrode 5 and an output terminal N of a coloration constant current circuit 15. The battery 11 serves as the power source of the bleaching constant current circuit 14 and the coloration constant current circuit 15.

The operation of the EC display device in FIG. 4 will be described in accordance with the combination table of the electric charge transfer and the electric charge injection/extraction shown in FIG. 5.

Figures 5, 6:
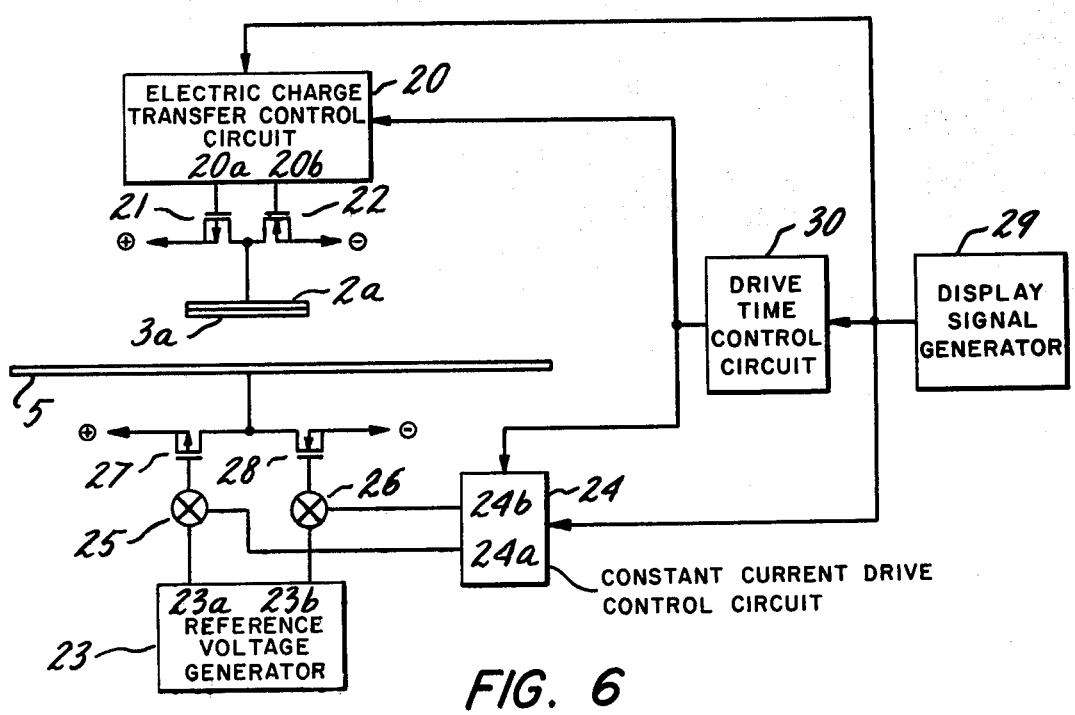
FIG. 5 shows a combination table of an electric charge transfer and an electric charge injection and extraction according to the present invention.
FIG. 6 shows a second embodiment according to the present invention.

In FIG. 5, the ten numerals of one digit are displayed in turn by way of an example, in which the ordinate indicates the display state and the abscissa indicates the display electrodes (segments), and the two lines in the right side show the amount of injection of the coloration electric charge and the amount of extraction of the same corresponding to each display state.

The amount of electric charge q in FIG. 5 designates the electric charge necessary for coloring one display electrode (namely the amount of electric charge for bleaching one display electrode).

The mark O indicates the display electrodes which change into the coloration state, the mark X indicates the display electrodes which change into the bleaching state, and no mark indicates the state in which the coloration and bleaching states are not changed, i.e., the memory state.

(i) In the case the display changes from "0" to "1":

The number of the colored segments is zero and the number of the bleached segments is 4. Since the bleaching constant current circuit 14 is operated in this case, the switch 12 is turned ON and the bleaching switches 9a, 9d, 9e and 9f are turned ON simultaneously. The other switches are turned OFF.

By this switching operation, the amount of the coloration electric charge 4×q(coulomb) corresponding to 4 segments is extracted by the bleaching constant current circuit 14 from the display device. The amount of the extraction electric charge (or the amount of the injection electric charge) is achieved by controlling either or both the operation time or/and the amount of the constant current of the bleaching constant current circuit 14. The control of the amount of the electric charge will be illustrated later. In the conventional electric charge transfer drive, the amount of the electric charge is controlled by transferring the electric charge, in this case, corresponding to the 4 segments to the dummy electric charge as illustrated before.

(ii) In the case the display changes from "1" to "2":

The number of the colored segments is 4 and the number of the bleached segments is 1. If the electric charge is transferred without the display dummy electrodes, the coloraction density after the transfer is deteriorated since the colored segments are excessive. Accordingly, the amount of the coloration electric charge 3q corresponding to 3 segments is injected to the segments to be newly colored in the EC display so that the display state may be stabilized by turning ON the switch 13 to operate the coloration constant current circuit in synchronism with the electric charge transfer. In this case the switches 8a, 8d, 8e and 8g are turned ON for the segments to be colored, and the switch 9c and the switch 13 are turned ON for the segments to be bleached.

(iii) In the case the display changes from "2" to "3":

Both the number of the colored segments and the number of the bleached segments are 1, i.e. the numbers of the colored segment and bleached segment are the same. In this case the display states are changed stably only by the electric charge transfer. Accordingly only the switches 8c and 9e are turned ON and the other switches are turned OFF.

The display of the EC display device is changed by the switching operation in turn in compliance with FIG. 5.

By the above explanation, it is to be noted that the driving method of the EC display device according to the present invention carries out the following three operations.

(1) In the case the number of the segments to be newly colored is equal to the number of the segments to be newly bleached, only the electric charge transfer is carried out.

(2) In the case the number of the segments to be newly colored is more than the number of the segments to be newly bleached by n, the electric charge of nq coulomb is injected into the predetermined segments in the EC display device from the coloration constant current circuit.

(3) In the case the number of the segments to be newly colored is less than the number of the segments to be newly bleached by m, the electric charge of mq coulomb is extracted from the predetermined segments in the EC display device by way of the bleaching constant current circuit.

Thus the electric charge is transferred stably without the display dummy electrodes by the above mentioned driving method.

After changing the display state, the entire colored segments are shorted by turning ON the coloration switches in order to average the coloration density completely.

FIG. 6 shows an embodiment illustrating the method of controlling the amount of injection (or the amount of the extraction) according to the present invention.

In FIG. 6, $2a$ denotes a transparent electrode, $3a$ denotes an EC film and numeral 5 denotes a counter electrode. Only one segment of FIG. 6 shows the EC display device and the other portions are omitted in order to avoid complexity of the drawing, the omitted structure being the same as shown in FIG. 4. An electric charge transfer control circuit 20 receives signals from a display signal generator 29 and a drive time control circuit 30, and an output terminal $20a$ of the circuit is connected to a gate of a P channel MOSFET (referred to as P-MOS hereafter) 21 and another output terminal $20b$ is connected to a gate of an N channel MOSFET (referred to as N-MOS hereafter) 22.

The source of the P-MOS 21 is connected to a positive electrode of a power source and the drain thereof is connected to both a drain of the N-MOS 22 and the transparent electrode $2a$. The source of the N-MOS 22 is connected to a negative electrode of the power source.

The P-MOS 21 acts as a bleaching switch and the N-MOS 22 acts as a coloration switch. Numeral 23 is a reference voltage generator having an output terminal $23a$ connected to a gate of a P-MOS 27 by way of an analogue signal transmitting switch 25, and having an output terminal $23b$ connected to a gate of an N-MOS 28 by way of an analogue signal transmitting switch 26. The source of the P-MOS 27 is connected to the positive electrode of the power source and the drain thereof is connected to the drain of the N-MOS 28, and at the same time connected to the counter electrode 5. The source of the N-MOS 28 is connected to the negative electrode of the power source. Numeral 24 is a constant current drive control circuit which receives signals from the display signal generator 29 and the drive time control circuit 30, and an output terminal $24a$ of the circuit 24 is connected to a control terminal of the analogue signal transmitting signal 25 and another output terminal $24b$ is connected to a control terminal of the analogue signal transmitting switch 26. The drive time control circuit 30 receives a signal from the display signal generator 29.

The operation of the EC display device according to the above construction will now be described.

The drive time control circuit 30 calculates the difference between the number of the segments to be newly colored x and the number of the segments to be newly bleached y; $z=x-y$ in response to an output signal from the display signal generator 29. The constant current control circuit 24 produces a signal to turn ON the analogue signal transmitting switch 25 at the output terminal $24a$ when $Z>0$, and produces a signal to turn ON the analogue signal transmitting switch 26 at the output terminal $24b$ when $Z<0$. The explanation will proceed taking the case that the analogue signal transmitting switch 25 is turned ON, initially. On this occasion, a reference voltage produced from the output terminal $23a$ is applied to the gate of the P-MOS 27 by way of the switch 25, and the P-MOS 27 feeds the amount of the constant electric charge to the EC display device. The application time of the constant current is controlled by the drive time control circuit 30, and the amount of the electric charge shown in FIG. 5 is injected into the EC display device.

When the analogue signal transmitting switch 26 is turned ON, the reference voltage produced from the output terminal $23b$ is applied to the gate of the N-MOS 28, and the N-MOS 28 operates as a constant current circuit to extract the constant electric charge.

In the foregoing embodiment, the output pulse width of the constant current drive control circuit 24 is defined as follows;

The pulse width t is set at the time the constant current circuit feeds or extracts the amount of the coloration electric charge (i.e., the amount of the bleaching electric charge as well) corresponding to one segment.

Namely, $q=I\times t$ is represented, where q is the amount of the coloration electric charge corresponding to one segment and I is the current value of the constant current circuit. In order to obtain the coloration electric charge corresponding to two segments, the pulse width is set at 2t, and in like manner, the coloration electric charge corresponding to an arbitrary number of segments a is obtained when the pulse width is set at at.

The operation of this embodiment according to the present invention will be illustrated briefly in conjunction with FIG. 5.

(i) In the case the display changes from "0" to "1":

The signal to turn ON the switch 26 is produced at the output terminal $24b$ of the constant current drive control circuit 24 for a time 4t so that the bleaching constant current circuit N-MOS 28 may extract the amount of the electric charge 4q from the EC device. Simultaneously the display electrodes (segments) A, D, E and F are connected to the positive electrode of the battery to be bleached. The display electrodes A, D, E and F are controlled by the electric charge transfer control circuit 20 and the P-MOS 21. The time and the timing to turn ON the P-MOS connected to the segments A, D, E and F is designed to equal the time (4t) and the timing to operate the constant current circuit.

(ii) In the case the display changes from "1" to "2":

The signal to turn ON the switch 25 is produced at the output terminal $24a$ of the constant current drive control circuit 24 for a time 3t so that the coloration constant current circuit P-MOS 27 may feed the amount of the electric charge 3q to the EC display device. Simultaneously the segments A, D, E and G are connected to the negative electrode of the battery to be colored, and the segment C is connected to the positive electrode of the battery to be bleached. The time and the timing to turn ON the N-MOS connected to the segments A, D, E and G and to turn ON the P-MOS connected to the segment C is equal to the time (3t) and the timing to operate the constant current circuit.

(iii) In the case the display changes from "2" to "3":

The segment C is connected to the positive electrode of the battery and the segment E is connected to the negative electrode of the battery. The display can be changed by using only the electric charge transfer.

The display can be changed by combining the electric charge transfer and the constant current drive in turn in conjunction with FIG. 5.

The embodiment illustrated so far defines the amount of the constant electric charge fed to and extracted from the EC display device and the operation time of the constant current circuit.

Figure 7:
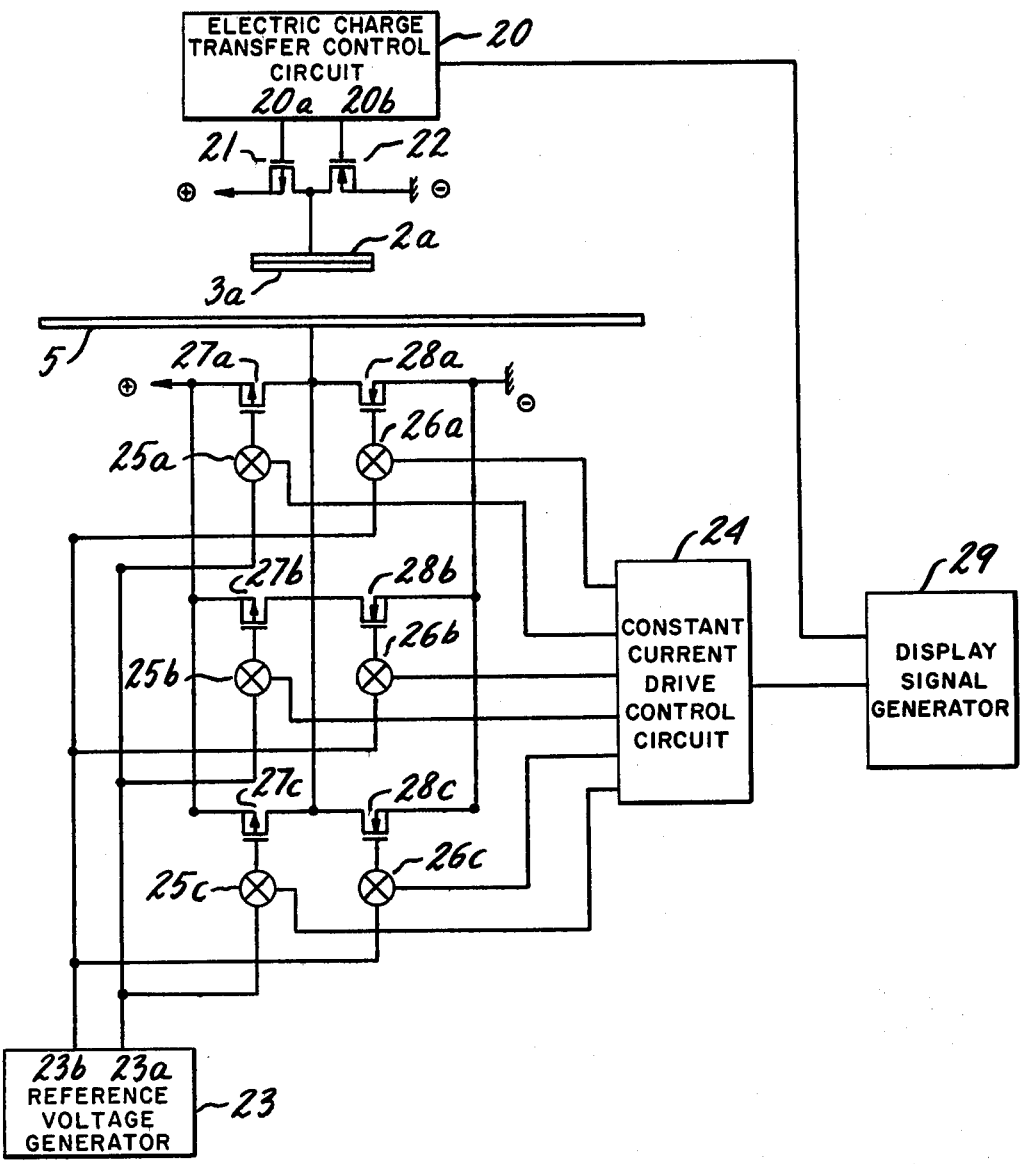
FIG. 7 shows a third embodiment according to the present invention.

FIG. 7 shows another embodiment according to the present invention. This embodiment pertains to a method of controlling the amount of the constant electric charge fed to and extracted from the EC display device and the current capacity of the constant current circuit.

There are two methods of controlling the current capacity: the method of controlling a gate bias of a constant current source, and the method of controlling the number of constant current sources. FIG. 7 shows the latter method.

The parts shown in FIG. 7 which are the same as in FIG. 6 are numbered identically and the explanation thereof is omitted. The constant current drive control circuit 24 receives signals from the display signal generator 29 and produces control signals to analogue signal transmitting switches 25a to 25c and 26a to 26c. The analogue signal transmitting switches 25a to 25c respectively connect the reference voltage produced from the output terminal 23a to gates of P-MOSs 27a to 27c. The analogue signal transmitting switches 26a to 26c respectively connect the reference voltage produced from the output terminal 23b to gates of N-MOSs 28a to 28c. The sources of the P-MOSs 27a to 27c are connected to the positive electrode of the battery and the sources of the N-MOSs 28a to 28c are connected to the negative electrode of the same. The drains of the P-MOSs 27a to 27c are connected to the drains of the N-MOSs 28a to 28c and connected to the counter electrode 5.

In the above embodiment, signals having a fixed pulse width are produced from the constant current control circuit 24 in order that the driving time of the constant current is fixed. The pulse width is set at the time the amount of the coloration electric charge (i.e., the amount of the bleaching electric charge as well) corresponding to one segment is fed or extracted.

It is to be noted that although each of the three constant current circuits for coloration and bleaching are shown in the embodiment, an arbitrary number of the constant current circuits can be set respectively.

Hereinafter the operation of the constant current circuits shown in FIG. 7 will be illustrated briefly in conjunction with FIG. 5.

(i) In the case the display changes from "0" to "1":

The output signal from the constant current drive control circuit 24 actuates four bleaching constant current circuits out of the plural ones for a predetermined time to extract the amount of the electric charge 4×q from the EC display device. Simultaneously the segments A, D, E and F are connected to the positive electrode of the battery to be bleached.

(ii) In the case the display changes from "1" to "2":

The output signal from the constant current drive control circuit 24 actuates three coloration constant current circuits out of the plural ones for a predetermined time to inject the amount of the electric charge 3×q into the EC display device. Simultaneously the segments A, D, E and G are connected to the negative electrode of the battery to be colored and the segment C is connected to the positive electrode of the battery to be bleached.

(iii) In the case the display changes from "2" to "3":

The segment C is connected to the negative electrode of the battery and the segment E is connected to the positive electrode of the same.

In this case the display can be changed by using only the electric charge transfer.

The display can be changed by combining the electric charge transfer and the constant current drive in turn in accordance with FIG. 5.

As illustrated hereinbefore, according to the present invention, the constant current circuits are used in the EC display device driven by the method of transferring the coloration electric charge held in the display electrodes in the coloration state to the display electrodes in the bleaching state by applying a voltage therebetween for compensating the unbalance of the number of the colored segments and the number of the bleached segments by the operation of the constant current circuits. Consequently the display dummy electrodes which have been necessary for the conventional electric charge transfer drive systems are eliminated. As a result, there is less restriction on designing the EC display device and the EC display device having a large effective display area can be realized.

What is claimed is:

1. In an electrochromic display device having a plurality of display electrodes exhibiting either colored or bleached states depending on the density of electric charge held by the display electrodes, a counter electrode spaced from the display electrodes, an electrolyte in contact with the counter and display electrodes, and means for selectively applying a voltage between preselected colored display electrodes and preselected bleached display electrodes effective to transfer electric charges held in said preselected colored display electrodes through the electrolyte to said preselected bleached display electrodes so as to interchange the display state of said preselected display electrodes: control means for determining the difference amount between the amount of electric charge held in said preselected colored display electrodes which is to be transferred to said preselected bleached display electrodes and the amount of electric charge required for coloring said preselected bleached display electrodes; and constant current means responsive to said control means for injecting or extracting said difference amount of electric charge to or from said preselected display electrodes through said counter electrode to thereby compensate for said difference amount.

2. An electrochromic display device as claimed in claim 1; wherein said means for selectively applying a voltage between preselected colored and bleached display electrodes includes a power source.

3. An electrochromic display device as claimed in claim 1; wherein the constant current means comprises a coloration constant current circuit for injecting the difference amount of electric charge to preselected bleached display electrodes in response to said control means, and a bleaching constant current circuit for extracting the difference amount of electric charge from preselected colored display electrodes in response to said control means.

4. An electrochromic display device as claimed in claim 3; further comprising a bleaching switch connected between said counter electrode and said bleaching constant current circuit, and a coloration switch connected between said counter electrode and said coloration constant current circuit.

5. An electrochromic display device as claimed in claim 3; including drive time control means for determining the operation time of said bleaching constant current circuit and said coloration constant current circuit.

6. An electrochromic display device as claimed in claim 3; wherein said bleaching constant current circuit comprises an N-channel MOS FET having a drain connected to said counter electrode, a source connected to a negative terminal of a power source and a gate connected to a reference voltage means through an analogue signal transmitting switch, and a P-channel MOS FET having a drain connected to said counter electrode, a source connected to a positive terminal of said power source and a gate connected to said reference voltage means.

7. An electrochromic display device as claimed in claim 1; wherein the constant current means comprises a plurality of coloration constant current circuits for injecting the difference amount of electric charge to preselected bleached display electrodes in response to said control means, and a plurality of bleaching constant current circuits for extracting the difference amount of electric charge from preselected colored display electrodes in response to said control means.

8. In an electrochromic display device having an electrolyte contained between two spaced-apart substrates: a given number of display segments disposed on the surface of at least one of the substrates and in contact with the electrolyte, each display segment comprising a transparent electrode and an electrochromic layer disposed on the transparent electrode such that the display segment exhibits either colored or bleached states depending on the amount of electric charge held by the display segment; means for selectively applying a charge transfer voltage between preselected bleached and colored display segments to effect transfer of electric charges between the preselected display segments through the electrolyte to thereby change the display state of the electrochromic display device; control means for determining whether the number of display segments to be changed to the colored state is n number more or m number less than the number of display segments to be changed to the bleached stated; and constant current means coacting with the control means for injecting an electric charge of nq coulomb, where q represents the amount of electric charge needed to change one display segment from the bleached state to the colored state, into predetermined bleached display segments when the determined number of display segments to be changed to the colored state is n number more than the number of display segments to be changed to the bleached state and for extracting an electric charge of mq coulomb from predetermined colored display segments when the determined number of display segments to be changed to the colored state is m number less than the number of display segments to be changed to the bleached state.

9. An electrochromic display device according to claim 8; including a counter electrode disposed on the surface of one of the substrates in contact with the electrolyte; and wherein the constant current means includes means for injecting electric charge into and extracting electric charge from predetermined display segments through the counter electrode and electrolyte.

10. An electrochromic display device according to claim 8; wherein the constant current means comprises at least one coloration constant current circuit for injecting electric charge into the predetermined bleached display segments, and at least one bleaching constant current circuit for extracting electric charge from the predetermined colored display segments.

11. An electrochromic display device according to claim 8; wherein the control means includes means for synchronizing the injection and extraction of electric charge with the application of the charge transfer voltage.

12. An electrochromic display device according to claim 11; wherein the means for synchronizing comprises a drive time control circuit.

13. An electrochromic display device according to claim 8; wherein all of the given number of display segments are of the same size.

14. In a driving method for driving an electrochromic display device to different display states by the electric charge transfer drive method in which electric charges for coloration in a colored display segment group are transferred through an electrolyte to a bleached display segment group to change the display state by the application of a charge transfer voltage between the colored and bleached display segment groups, the steps of: determining whether the number of display segments to be next changed to the colored state is n number more or m number less than the number of display segments to be next changed to the bleached state; and injecting an electric charge of nq coulomb, where q represents the amount of electric charge needed to change one display segment from the bleached state to the colored state, into predetermined bleached display segments when the determined number of display segments to be next changed to the colored state is n number more than the number of display segments to be next changed to the bleached state and extracting an electric charge of mq coulomb from predetermined colored display segments when the determined number of display segments to be next changed to the colored state is m number less than the number of display segments to be next changed to the bleached state.

15. A driving method according to claim 14; including synchronizing the injection and extraction of electric charge with the application of the charge transfer voltage.

* * * * *